3,128,191
PROCESSES FOR IMPROVING THE FLAVOR AND TENDERIZING MEAT BY ANTE-MORTEM INJECTION OF THAMNIDIUM AND ASPERGILLUS
Beverly E. Williams, La Grange Park, Ill., assignor to Hodges Research and Development Company, New York, N.Y., a corporation of California
No Drawing. Filed Feb. 7, 1963, Ser. No. 256,831
2 Claims. (Cl. 99—107)

This invention relates to processes for improving the flavor of and for tenderizing meat by injection of Thamnidium and Aspergillus into the vascular system of a living livestock animal prior to slaughter.

United States Patent No. 2,903,362, issued on September 8, 1959, to Jack S. Beuk et al., for a method for improving the tenderness of meat through enzymatic action in which a proteolytic enzyme in liquid media is injected into the vascular system of a living livestock animal about 24 hours prior to slaughtering of the animal. In this patent the proteolytic enzyme is distributed through the meat by the vascular system and acts to tenderize the meat during the normal aging period after slaughter. Such a proteolytic enzyme cannot improve the flavor of the meat. There are also important technical and economical disadvantages to this process.

In the present concept the live, active, viable organisms of Thamnidium and Aspergillus are injected into the vascular system of the living livestock animal whereas enzymes are not living organisms but are chemical catalysts. Prior to the present invention those skilled in the art would not have expected that injecting live organisms in living cattle just prior to slaughter would or could improve the tenderness and flavor of the meat. Such experts could not foresee the results of the injection of Thamnidium and Aspergillus into the living animal and it was widely believed that such injections would instantaneously kill the livestock animal.

Most unexpectedly, I have found that, if controlled amounts of Thamnidium and Aspergillus are injected into a living livestock animal in a physiological saline solution these live, active, viable organisms not only do not cause sudden or even delayed death to the livestock animal but are distributed throughout the meat by the vascular system of the animal. After injection the livestock animal may be held alive for up to about four hours and then slaughtered. The carcass is then chilled and held in a cooler for aging, that is, to permit the development of the mold spores within the tissues of the meat. The retail cuts of meat from the carcass will show uniform improvement both in tenderness and in flavor. The Thamnidium injected into the living animal produces a delectable aged flavor in the meat and the Aspergillus injected into the living animal, working synergistically with the Thamnidium, produces greatly improved tenderness in the meat.

It is therefore the object of the present invention to provide improved tenderness and flavor in retail cuts of meat by injection of the livestock animal ante-mortem in the vascular system with an isotonic aqueous solution of Thamnidium and Aspergillus, the animal then being slaughtered after a waiting period and the carcass cooled and hung in the conventional cooler for from one up to ten days at approximately 35° to 40° F.

The Thamnidium useful in the present concept can be described as follows:

Class—Phycomycetae
Order—Mucorales
Family—Thamnidiaceae
Genus—Thamnidium
Species—One of which is *Thamnidium elegans*

Family Thamnidiaceae: The genera of this family show the beginning of the differentiation into two types of sporangium, viz., the large terminal sporangium with a columella and the small lateral separable sporangioles which lack a columnella. The latter are borne on short, variously divided branches arising laterally on the main axis of the sporangiophore at whose apex the large sporangium is produced, if present. In Thamnidium the spores are alike in sporangium and sporangiole. In Thamnidium the terminal sporangium, which is often the first one formed, is larger and possesses a well-developed columella; somewhat below it there grow out from the sporangiophore short branches (often much forked dichotomously), all terminating in small sporangia or some in pointed spines. These small sporangia (sporangioles) are few-spored, sometimes with not over two or three spores, and possess no columella. The whole sporangiole becomes detached and distributed by air currents. As water is absorbed the spores swell and burst the sporangial wall and escape. In some species of Thamnidium under certain conditions only the sporangioles are formed.

In the mold culture products of the large Aspergillus group, I prefer to use the organisms known to bacteriologists as organisms of the *Aspergillus oryzae* group. The molds of this group are non-pathogenic and these organisms will grow and elaborate the desired proteases in standard media and transplants will grow and flourish under ordinary laboratory procedures.

The amounts of Thamnidium and Aspergillus to be injected into the livestock animal may vary from 500 to 1000 spores total of these molds per milliliter of the animal's blood. Assuming that an average beef cattle has 10 liters of blood, the physiological saline injection solution should contain from 5,000,000 to 10,000,000 spores total of these molds. These molds are usually used in equal amounts in the solution but variations from this ratio may be used. It should be kept in mind that the Thamnidium mold contributes more to flavor than to tenderness while the Aspergillus mold contributes more to the tenderness of the meat than to its flavor. The saline solution is preferably of sterile distilled water having an isotonic salinity of approximately 0.8% NaCl. Approximately 50 ml. of the saline solution containing these molds is vascularly injected into the average beef cattle at 5 ml. for each liter of blood.

In accordance with a preferred embodiment of the processes of the present invention, a U.S. Good grade beef steer weighing approximately 1050 pounds and producing a six hundred pound beef carcass consisting of two split, dressed sides of three hundred pounds each was injected with an isotonic blood-level temperature saline solution containing approximately 5 million viable spores each of the molds *Thamnidium elegans* and *Aspergillus oryzae*. The live animal was restrained and an incision made in the jugular vein to permit the blood stream to accept the alien solutions. Without difficulty, over a period of about five minutes, the entire 50 ml. of solution was injected and gravity drained into the jugular vein and thereafter, circulated throughout the vascular system to the venules, capillaries and arterioles of the flesh of the animal. Approximately 30 minutes after the injection, the animal was slaughtered and dressed in the usual manner and the two sides of beef were placed in a regular cooler for conventional chilling. As a control for the process, a similar steer of like age and weight from the same feeder's lot was selected, held and slaughtered immediately following the treated steer. The two cattle were held in the same cooler under identical conditions for ten days. Comparable steaks and roasts were cut from comparable sides of each beef at two, five and ten day periods, rated for appearance, color and other visual characteristics, then cooked similarly and compared organoleptically by a panel of meat experts. In all cases, the panel preferred the treated meat and rated it higher on their score cards both for tenderness and flavor. The improvement in flavor was more significant than the improvement in tenderness although tests made on a Warner-Bratzler shear machine of cylinders of meat cooked to 155° F. indicated less resistance and therefore more tenderness for the treated meat.

The livers and kidneys of the two beeves were compared, then cooked and taste-tested. There was found to be no over-tenderization or mushiness such as is often the case with animals injected ante-mortem with physiological solutions containing proteolytic enzymes, such as papain. This is of definite economic and commercial advantage in favor of my process.

In another test, an approximate 1000 pound U.S. Choice steer was injected in the vascular system with a 50 ml. aqueous, isotonic saline solution containing approximately 10,000,000 spores each of Thamnidium and Aspergillus. The steer was held for four hours and then slaughtered. The steer was dressed, chilled and hung in the cooler in split sides the usual way at approximately 35° F. After hanging in the cooler for five days the meat was subjected to organoleptic testing. The taste panel found unexpected tenderness but found the meat to have an extreme aged flavor favored by connoisseurs but not by the usual eating public.

In view of this result a third steer of similar size but of somewhat lower grade, approximately U.S. Commercial grade, was injected in the vascular system with the same amount of this aqueous isotonic saline solution but containing approximately 5,000,000 spores total of Thamnidium and 10,000,000 spores of Aspergillus. The steer was held for two hours and then slaughtered, dressed, cooled and hung in the conventional cooler at approximately 35° F. At 24 hours, 48 hours and five days of cooler hanging, samples from this treated steer carcass were subjected to organoleptic testing. The test panel of experts found for this grade of beef, unexpected tenderness of the meat at each periodic sampling and found a very desirable aged flavor but not as pronounced as in the second test where the flavor rated as "ripe."

Similar procedures, injecting the living cattle vascularly, just prior to slaughter, with isotonic solutions of Thamnidium and isotonic solutions of Aspergillus individually, with the steers slaughtered and treated as above described, showed, in the opinion of the panel of judges, that the Thamnidium injected cattle rated high in flavor but not in tenderness and the Aspergillus injected cattle rated high in tenderness but not in flavor. It is to be concluded that Thamnidium contributes more to flavor and less to tenderness and that Aspergillus contributes more to tenderness and less to flavor with the combination of the two having a synergistic effect providing optimum flavor and optimum tenderness.

In order to establish the unexpected results of the preferred procedures discussed above, two U.S. Good steers of closely corresponding characteristics, both of the same man's feeding were injected in the vascular system prior to slaughter, the control steer being injected with 50 ml. of an isotonic saline solution only while the other steer was similarly treated with a similar isotonic solution containing Thamnidium and Aspergillus molds, this solution containing approximately 7,500,000 spores total of the molds. Both cattle were held for approximately four hours and then slaughtered, processed in the usual manner, chilled and both carcasses placed in a cooler at approximately 35° F. Both cattle were injected alive with an equal volume of fluid so as not to upset the equilibrium of one and not the other.

The sides of the control and the treated carcasses were held for ten days in the cooler and were then cut into wholesale and retail portions. Matched portions were then subjected to organoleptic testing. The test meat portions from the carcass treated by the present procedures were unanimously voted to have a decided aged flavor which would have wide acceptance by the eating public and the treated meat exhibited exceptional tenderness when compared to the control meat portions.

Thamnidium and Aspergillus spores are both psychrophilic or "cold loving" and are therefore able to carry out their functions of flavoring and tenderizing the cold meat even at the temperature range found in the usual cooler of from 34° to 40° F.

It should now be apparent that the present invention in every way satisfies the objective discussed above.

Variations may now be suggested to those skilled in the art in the preferred procedures discussed above without departing from the present inventive concept. Reference should therefore be had to the appended claims to determine the scope of this invention.

What is claimed is:

1. In a process for improving the flavor and tenderness of meat, the steps of injecting an aqueous physiological, isotonic solution containing from approximately equal parts of the molds Thamnidium and Aspergillus to one part of Thamnidium to two parts of Aspergillus into the vascular system of a living livestock animal, holding the animal alive for up to four hours after the injection, then slaughtering and dressing the animal in the conventional manner and then holding the animal carcass at approximately 35° F. for from one to ten days, the injection solution containing from approximately 500 to approximately 1000 viable spores of Thamnidium and Aspergillus for each milliliter of the animal's blood, approximately 5 ml. of the solution being injected for each liter of the animal's blood.

2. A process as described in claim 1 in which the species of Thamnidium is *elegans* and Aspergillus is *oryzal*.

References Cited in the file of this patent

UNITED STATES PATENTS

| 2,805,163 | Williams et al. | Sept. 3, 1957 |
| 2,852,391 | Williams | Sept. 16, 1958 |
| 2,961,321 | Williams | Nov. 22, 1960 |